(12) United States Patent
Blomberg

(10) Patent No.: US 8,848,407 B2
(45) Date of Patent: Sep. 30, 2014

(54) METHOD IN A VOLTAGE SOURCE CHAIN-LINK CONVERTER, COMPUTER PROGRAMS AND COMPUTER PROGRAM PRODUCTS

(71) Applicant: Anders Blomberg, Vasteras (SE)

(72) Inventor: Anders Blomberg, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/057,457

(22) Filed: Oct. 18, 2013

(65) Prior Publication Data

US 2014/0043873 A1 Feb. 13, 2014

Related U.S. Application Data

(63) Continuation of application No. PCT/EP2011/056153, filed on Apr. 18, 2011.

(51) Int. Cl.
*H02H 7/10* (2006.01)
*H02M 1/32* (2007.01)
*H02H 7/125* (2006.01)
*H02M 7/49* (2007.01)

(52) U.S. Cl.
CPC .............. *H02H 7/1255* (2013.01); *H02M 1/32* (2013.01); *H02M 2001/325* (2013.01); *Y02E 40/26* (2013.01); *H02M 7/49* (2013.01); *H20J 3/1857* (2013.01)
USPC ............................................ 363/50; 323/207

(58) Field of Classification Search
CPC .............................. H02H 7/10; H02H 7/1216
USPC ......... 363/65–72, 148, 149, 157, 159, 50, 51, 363/54, 56.02, 56.04, 58; 323/207; 361/56
See application file for complete search history.

(56) References Cited

U.S. PATENT DOCUMENTS

| 6,222,284 B1 | 4/2001 | Hammond et al. |
| 7,768,337 B2 | 8/2010 | Bayerer |

(Continued)

FOREIGN PATENT DOCUMENTS

| DE | 103333798 | * | 2/2005 |
| EP | 2073368 A1 | | 6/2009 |
| WO | 2010102666 A1 | | 9/2010 |

OTHER PUBLICATIONS

International Preliminary Report on Patentability Application No. PCT/EP2011/056153 Completed: Sep. 2, 2013 15 pages.

(Continued)

*Primary Examiner* — Gary L Laxton
*Assistant Examiner* — Kyle J Moody
(74) *Attorney, Agent, or Firm* — St. Onge Steward Johnston & Reens, LLC

(57) ABSTRACT

A method in a voltage source chain-link converter. The method includes: detecting a failure of a device of one converter cell module; blocking a phase-leg including the failed position; discharging to zero a capacitor unit of the converter cell module including the failed position; and providing a current path for the phase current through the converter cell module with the failed position, the current path including a first branch, in turn including corresponding positions of the first phase-leg and the second phase-leg in the full H-bridge arrangement, the first branch being connected in parallel to a second branch including the failed position, the second branch including the remaining two positions of the full H-bridge arrangement. The invention also encompasses corresponding computer program and computer program products.

5 Claims, 5 Drawing Sheets

(56) References Cited

U.S. PATENT DOCUMENTS

| | | | |
|---|---|---|---|
| 8,314,602 B2* | 11/2012 | Hosini et al. ................. 323/363 |
| 8,416,595 B2* | 4/2013 | Hasler ............................ 363/87 |
| 8,638,576 B2* | 1/2014 | Hosini et al. .................... 363/50 |
| 2006/0071640 A1 | 4/2006 | McCool et al. |
| 2008/0174182 A1 | 7/2008 | Hammond |
| 2011/0032652 A1 | 2/2011 | Shimada |
| 2011/0205768 A1* | 8/2011 | Svensson ........................ 363/49 |
| 2012/0063181 A1* | 3/2012 | Chimento et al. ......... 363/56.03 |
| 2012/0155130 A1* | 6/2012 | Hosini et al. .................... 363/64 |
| 2013/0114317 A1* | 5/2013 | Schlapbach .................. 363/131 |
| 2013/0121045 A1* | 5/2013 | Murakami et al. ............. 363/67 |
| 2014/0049230 A1* | 2/2014 | Weyh ............................ 323/207 |

OTHER PUBLICATIONS

International Search Report and Written Opinion of the International Searching Authority Application No. PCT/EP2011/056153 Completed: Dec. 11, 2012; Mailing Date: Dec. 20, 2012 13 pages.

Written Opinion of the International Preliminary Examining Authority Application No. PCT/EP2011/056153 Mailing Date: Jun. 28, 2013 6 pages.

* cited by examiner

METHOD IN A VOLTAGE SOURCE CHAIN-LINK CONVERTER, COMPUTER PROGRAMS AND COMPUTER PROGRAM PRODUCTS

FIELD OF THE INVENTION

The invention relates generally to the field of converters and in particular to chain-link converters and protection thereof.

BACKGROUND OF THE INVENTION

A reliable operation of an electric power system supplying electricity is expected by all users thereof, e.g. homes and industries. In order to provide the requested reliable operation, apparatuses of the electric power system need to be fault-tolerant and enable continued operation even in the event of failure of components of the apparatus.

As a particular example of such apparatus, a static compensator (STATCOM) can be mentioned. The STATCOM comprises a voltage source converter (VSC) having an AC side connected to an AC network and a DC side connected to an electric power storage such as capacitors. The voltage output from the STATCOM AC side is controlled and the STATCOM thereby acts to supply or absorb reactive power from the AC network. The STATCOM can thereby offer voltage stability to the electric power system.

One type of VSC comprises a chain-link converter, also denoted cascaded H-bridge converter. In such VSC a number of cell modules are series-connected. It is readily understood that when increasing the number of cell modules (number of power semiconductors), the risk of failure increases.

The VSCs, being an apparatus of the electrical power system, need to be fault-tolerant, thus enabling continued operation thereof even in the event of a failure. Such fault tolerance can be achieved in different ways. One way is to provide redundancy, e.g. by bypassing a cell module containing the failed device and continue operation with the undamaged cell modules.

WO 2010/102666 discloses methods and means for a failure mode of operation of a voltage source chain-link converter. The voltage source chain-link converter described comprises a number of converter cell modules connected in series, and one or more redundant converter cell modules are provided. Each converter cell module comprises two phase legs. In order to bypass a faulty converter cell module, the phase leg comprising the faulty converter cell module is blocked and the other phase leg is driven to provide zero AC voltage.

The devices and methods of WO 2010/102666 are well-functioning, but it would be desirable to provide alternative means and methods for providing fault-tolerance of such a voltage source chain-link converter.

SUMMARY OF THE INVENTION

It is an object of the invention to provide a fault-tolerant voltage source converter, and in particular providing a reliable by-pass mode.

The object is in accordance with a first aspect achieved by a method in a voltage source chain-link converter comprising one or more phases. Each phase comprises a number of series-connected full bridge converter cell modules comprising semi-conductor switches connected in a full H-bridge arrangement with a capacitor unit. Each semi-conductor switch has a respective free-wheeling diode connected in parallel thereto, and each full H-bridge arrangement comprises a first phase-leg and a second phase-leg. The method comprises the steps of: detecting a failure of a position of one of the converter cell modules, the failed position comprising a failed semi-conductor switch, failed free-wheeling diode or failed gate unit; blocking the phase-leg comprising the failed position; discharging to zero the capacitor unit of the converter cell module comprising the failed position; and providing a current path for the phase current through the converter cell module with the failed position, the current path comprising a first branch, in turn comprising corresponding positions of the first phase-leg and the second phase-leg in the full H-bridge arrangement. The first branch is connected in parallel to a second branch comprising the failed position, the second branch comprising the remaining two positions of the full H-bridge arrangement. By means of the invention, there is no need to trip the chain-link converter when a failed position is detected. The failed cell module can remain in-circuit and bypass the phase current, and a reliable operation of the chain-link converter is provided.

In an embodiment, the step of detecting a failure comprises receiving information from sensors of gate units of each semi-conductor switch position and analyzing the information in order to detect fault conditions.

In another embodiment, the step of blocking comprises turning OFF the semi-conductor switch of the other position of the phase-leg comprising the failed position.

In another embodiment, the step of discharging comprises switching the functioning second phase-leg at zero current crossings, while keeping the non-faulty semi-conductor switch of the first phase leg in ON or OFF state depending on fault conditions of the failed position.

In another embodiment, the phase current is shared between the first branch and the second branch in accordance with their respective characteristics.

The object is in accordance with a second aspect achieved by a computer program for controlling a chain-link converter comprising one or more phases. Each phase comprises a number of series-connected full bridge converter cell modules comprising semi-conductor switches connected in a full H-bridge arrangement with a capacitor unit. Each semi-conductor switch has a respective free-wheeling diode connected in parallel thereto, each full H-bridge arrangement comprising a first phase-leg and a second phase-leg. The computer program comprises computer program code which when run on a processor causes a control device controlling the chain-link converter to perform the steps of: detecting a failure of a position of one of the converter cell modules; blocking the phase-leg comprising the failed position, the failed position comprising a failed semi-conductor switch, failed free-wheeling diode or failed gate unit; discharging to zero the capacitor unit of the converter cell module comprising the failed position; and providing a current path for the phase current through the converter cell module with the failed position, the current path comprising a first branch, in turn comprising corresponding positions of the first phase-leg and the second phase-leg in the full H-bridge arrangement, the first branch being connected in parallel to a second branch comprising the failed position, the second branch comprising the remaining two positions of the full H-bridge arrangement.

The invention also encompasses computer program products comprising a computer program as above, and computer readable means on which the computer program is stored.

Further features and advantages thereof will become clear upon reading the following detailed description and the accompanying drawings.

DETAILED DESCRIPTION OF THE INVENTION

In order to provide thorough understanding of the present invention, a chain-link converter and parts thereof relevant for the invention will first be described with reference to FIGS. 1-3.

Figure 1:
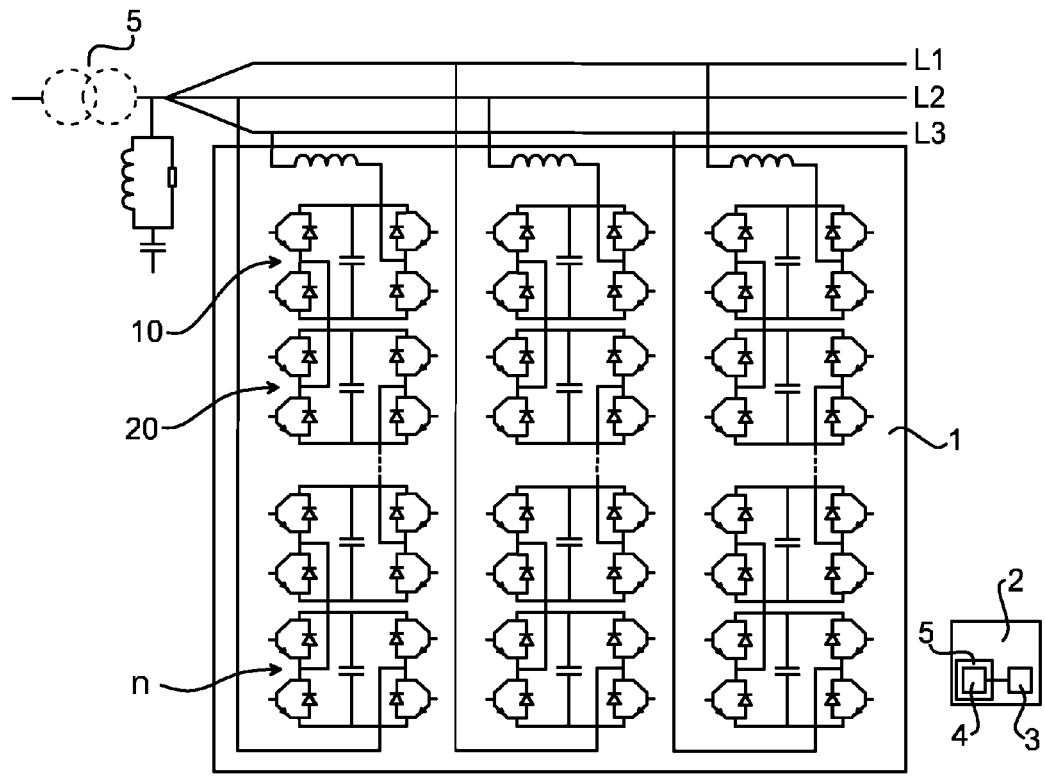
FIG. 1 illustrates a chain-link converter.

FIG. 1 illustrates a chain-link converter 1 comprising three phases L1, L2, L3. Each phase comprises a number of series-connected converter full bridge cell modules; phase L1, for example, comprises converter cell modules 10, 20, . . . , n. The chain-link converter 1 of FIG. 1 is illustrated as a delta connected arrangement, but the phases L1, L2, L3 could be arranged differently, e.g. in a Y-connected arrangement. The phases L1, L2, L3 of the chain-link converter 1 are connected to an AC power network, also denoted grid, via phase reactors 4 and possibly transformers 5. The chain-link converter 1 is controlled by means of a control device, schematically illustrated at reference numeral 2.

Figure 2:
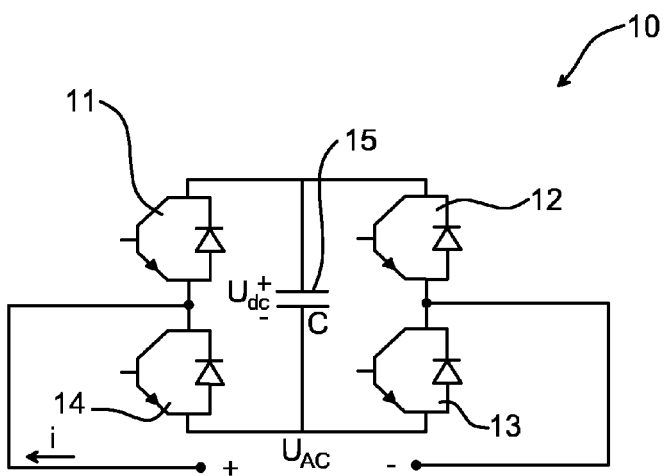
FIG. 2 illustrates a cell module of the chain-link converter of FIG. 1.

FIG. 2 illustrates a converter cell module 10, in the following denoted cell module 10, of the chain-link converter of FIG. 1. The cell module 10, sometimes also denoted converter link or chain-link cell module, comprises four valves 11, 12, 13, 14. Each valve comprises a semi-conductor switch, such as an insulated gate bipolar transistor (IGBT). Or rather, in order to manage high voltages, each valve comprises a number of series-connected semi-conductor switches. In the following IGBT is used for describing the invention, but other semi-conductor devices could alternatively be used, such as for example gate turn-off thyristor (GTO), Integrated Gate-Commutated Thyristor (IGCT), MOSFET or other self-commutated devices. The IGBTs of the valves can be switched on and off with a certain switching frequency. A free-wheeling diode, also denoted anti-parallel diode, is connected in parallel with each IGBT. The diode conducts in the opposite direction of the IGBT. The valves 11, 12, 13, 14 are connected in a full-bridge (short for full H-bridge) arrangement with a capacitor unit 15. Each converter cell module 10, 20, . . . , n can be seen as comprising two phase-legs, each phase-leg comprising two valves and each valve having an anti-parallel diode. In particular, valves 11 and 14 constitute a first phase-leg and valves 12 and 13 constitute a second phase-leg.

Figure 3:
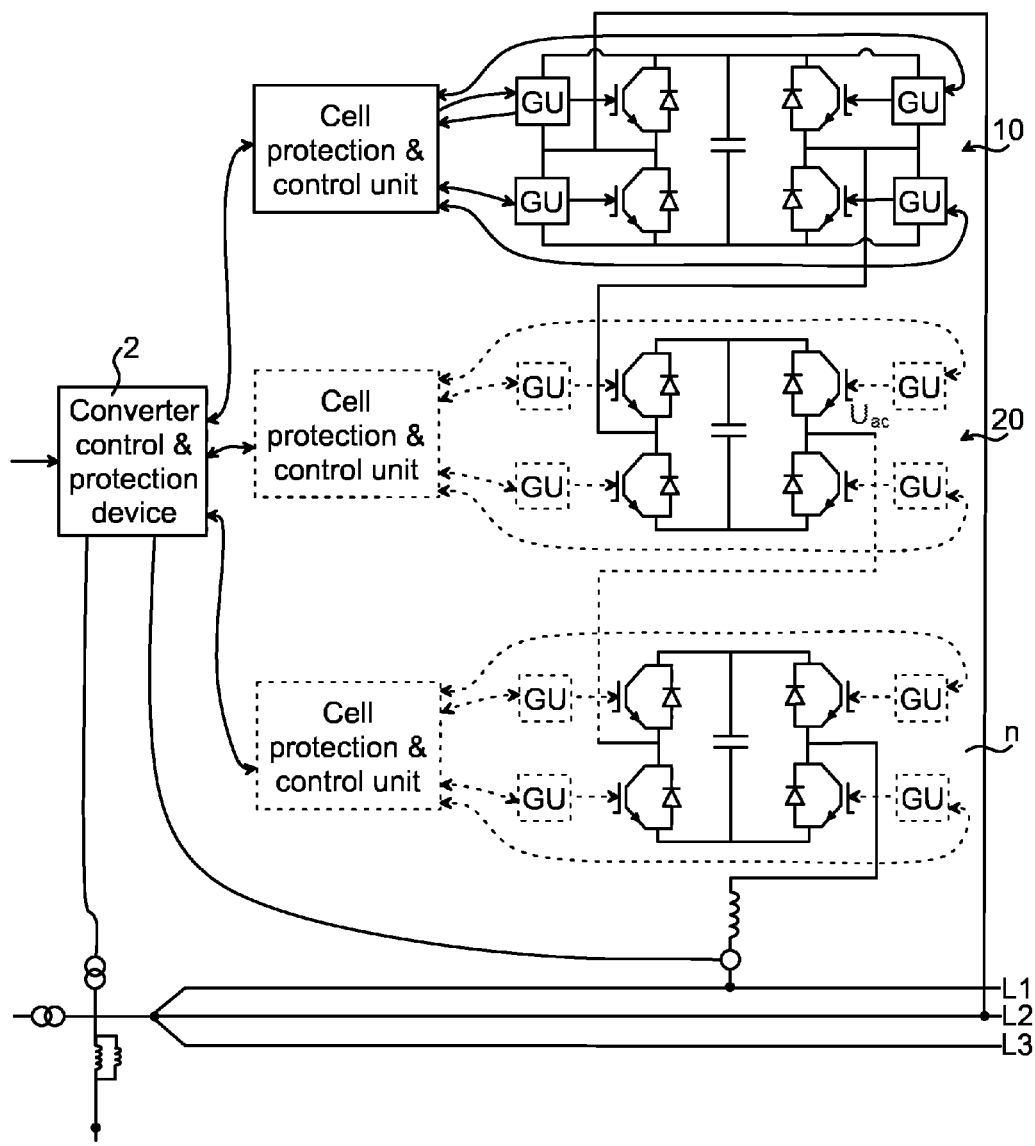
FIG. 3 illustrates the chain-link converter and the control and protection thereof.

FIG. 3 illustrates one phase of the chain-link converter of FIG. 1 and also the control and protection thereof. The cell modules 10, 20, . . . n of phase L1 each cell module 10, 20, . . . n, is assigned a cell control and protection unit connected to the control device 2. Each valve of each cell module comprises a gate unit (GU) by means of which the valve can be controlled. The control device 2 provides control signals for switching each IGBT "ON/OFF". The control device 2 is further responsible for maintaining the safety of the chain-link converter, an aspect of which will be described with reference to the remaining FIGS. 4-7.

The further phases L2, L3 of the chain-link converter 1 are arranged in the same way as described above.

Briefly, in different aspects of the invention a bypass mode of a cell module having a failed position is provided. In the bypass mode of the cell module of a chain-link converter (cascaded H-bridges) an alternative path is provided for the phase current in a failed cell module through functioning IGBTs in a branch opposite to the failed IGBT, i.e. a branch in parallel with the failed IGBT. Thereby the failed cell module can remain in-circuit and bypass the phase current without tripping the chain-link converter. It is noted that the device being failed is not restricted to the IGBT, but could alternatively be e.g. the gate unit.

Figure 4A:
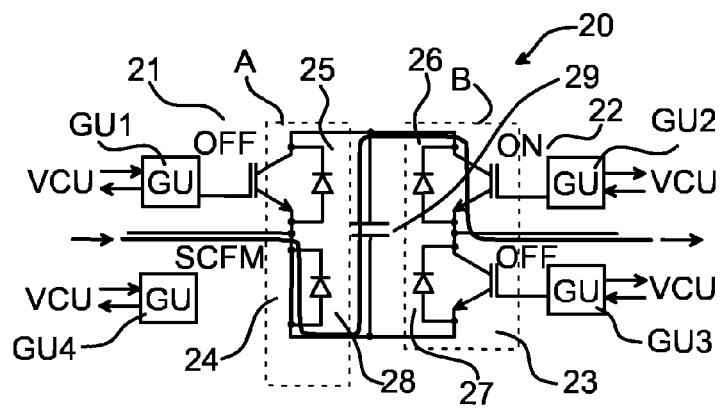
FIGS. 4a and 4b illustrate current paths during a discharge mode with failed device in short circuit failure mode.
Figure 4B:
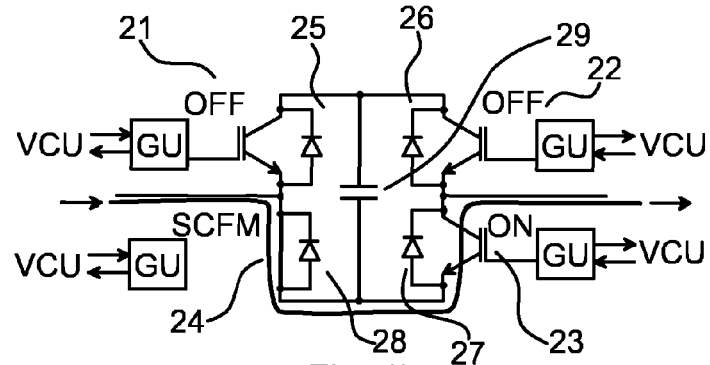

In order to provide the desired alternative path for the phase current, the capacitor unit, which in the following is denoted cell capacitor, of a cell module must first be discharged to zero in a controlled manner, as devices (e.g. IGBTs) could otherwise be damaged. In particular, the energy of the cell capacitor could discharge uncontrolled through the failed phase leg, thus causing damage to the devices of the phase leg. FIGS. 4a and 4b illustrate current paths during such controlled discharge mode of the cell capacitor.

In FIG. 4a, reference is made to cell module 20 as having the failed device. In line with the earlier description, the cell module 20 comprises four IGBTs 21, 22, 23, 24 having a respective free-wheeling diode 25, 26, 27, 28 connected in parallel. A first phase-leg A comprises IGBT 21, its diode 25, IGBT 24 and its diode 28, and a second phase-leg B comprises IGBT 22, its diode 26, IGBT 23 and its diode 27.

The uppermost IGBTs of each phase leg and their respective diodes and gate units, i.e. IGBT 21, diode 25, gate unit GU1 and IGBT 22, diode 26, gate unit GU2 are sometimes denoted upper IGBT positions, of the respective phase-legs. Correspondingly, the lower IGBTs, diodes and gate units of each phase leg, i.e. IGBT 23, diode 27, gate unit GU3 and IGBT 24, diode 28, gate unit GU4 are then denoted lower IGBT positions of the respective phase-legs. These positions are illustrated encircled in FIG. 6 and denoted POS1 (IGBT 21, diode 25, gate unit GU1), POS2 (IGBT 22, diode 26, gate unit GU2), POS3 (IGBT 23, diode 27, gate unit GU3) and POS4 (IGBT 24, diode 28, gate unit GU4).

In the case illustrated in FIGS. 4a, 4b, the lower IGBT 24 of the first phase-leg A (POS3) has failed and entered a short circuit failure mode. The first phase-leg A, comprising the failed device, is immediately blocked upon detection of a failure, i.e. upper IGBT 21 is turned off. The cell capacitor 29 is then discharged by controlling the second phase-leg. In particular by switching the IGBTs 22, 23 of this second phase-leg, which is healthy, at the zero-crossings the cell capacitor 29 can be discharged to zero.

In FIG. 4a, the current flow in the cell module of a first half switching cycle is illustrated, the current thus having a first current direction (indicated in conventional manner by the arrows). During this half switching cycle the cell capacitor 29 can be discharged. The current flows through the upper IGBT 22 of the second phase-leg B, through the cell capacitor 29 and through the failed lower IGBT 24 (being short-circuited) of the first phase-leg. The cell capacitor 29 is thus being discharged.

FIG. 4b illustrates current paths during the second half switching cycle following upon a next zero-crossing, and providing the reverse current direction. The current direction is again indicated in conventional manner by the arrows. During this second half switching cycle, the current flows through the failed IGBT 24 (being short-circuited) and the lower IGBT 23 of the second phase-leg. During this half switching cycle the cell capacitor 29 is not being discharged.

Figure 5:
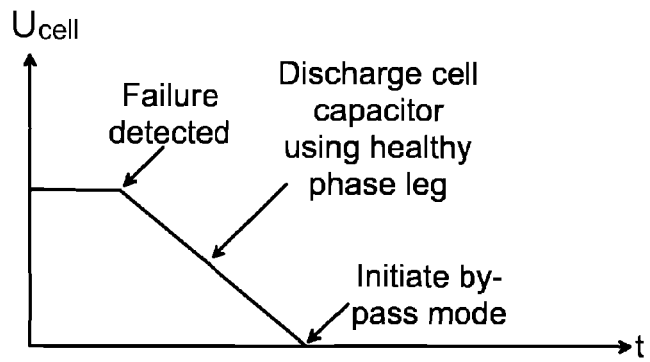
FIG. 5 illustrates the capacitor voltage of the capacitor of a converter cell module as a function of time upon fault occurrence.

FIG. 5 is a graph illustrating the above discharging of the cell capacitor 29. In particular, the voltage of the cell capacitor 29 is shown as a function of time. When a failure is detected, the discharging of the cell capacitor is initiated. The phase-leg A with the faulty device is blocked, but the chain-link converter 1 is not tripped. The other phase-leg, i.e. the healthy phase-leg B, is controlled, i.e. switched at the zero crossings (zero current switching), in order to discharge the cell capacitor to zero. The failed device has to be able to stay in stable short-circuit failure mode long enough for the discharging of the cell capacitor to be completed. As an example, a press-pack device (pressure-assembled device) such as StakPak™ could be used. If the failed device is in stable short circuit failure mode the cell capacitor can be discharged while keeping the functioning IGBT 21 (POS1) of the phase-leg A with the faulty device constantly OFF. Otherwise, if the failed IGBT enters open circuit failure mode during the discharging mode, the other IGBT (POS1) in this phase-leg A would have to be switched ON in order to discharge the cell capacitor 29. Switching this position (POS1) at full cell voltage with the risk of the failed device breaking down into short circuit, would give a potentially dangerous situation with high di/dt. This risk is avoided if it can be safely assumed that the failed device will stay in short circuit failure mode for a time long enough for completing the discharge of the capacitor unit.

When the cell module voltage is zero, the bypass mode can be initiated, which will be described next with reference to FIG. 6.

Figure 6:
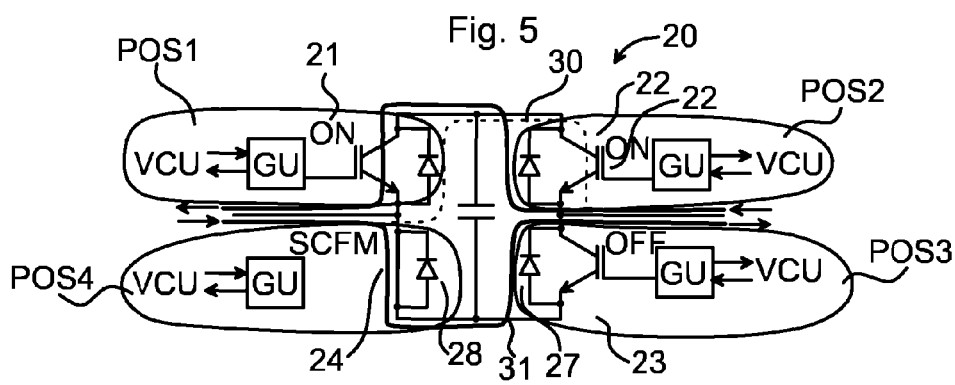
FIG. 6 illustrates current paths in the cell module in a bypass mode with failed device in short circuit failure mode.

FIG. 6 illustrates current paths of the cell module 20 in the by-pass mode thereof, and in particular when the failed IGBT 24 is in short circuit failure mode. This IGBT by-pass mode is entered once the cell capacitor 29 has been discharged. In the following the term "branch" is used. An upper branch comprises the upper IGBTs 21, 22 (POS1, POS2) and a lower branch comprises the lower IGBTs 23, 24 (POS3, POS4). The healthy IGBTs 21, 22 (POS1, POS2) in the branch parallel with the failed IGBT 24 are turned on. This branch parallel with the failed IGBT 24 provides a current path for the phase current (indicated at reference numeral 30) of the phase L1 that comprises the converter cell module 20 having the failed device 24. The phase current will be shared between the two branches (30, 31) in relation to their respective characteristics. The main part of the current will go through the lower branch (31), having the failed device in short circuit failure mode.

The healthy IGBT 23 (POS3) in the same branch as the failed IGBT, which in the illustrated case is the lower branch, can either be ON or OFF. If the healthy IGBT 23 of the lower branch is kept OFF, the rms (root-mean-square) current in a failed chip (the chip being part of the IGBT 24 or its freewheeling diode 28) is reduced, since current will flow through the failed chip only in one direction, namely in the diode's 27 forward direction. A lower rms current through the chip generally means that the chip can stay longer in short-circuit failure mode before going into open circuit failure mode.

The failed device, e.g. the IGBT, can be in any state, i.e. low or high resistive short-circuit failure mode (SFCM) or open circuit failure mode (OCFM). The resistance of the chip tends to increase towards the end of its service life; the chip would thus typically then be in a high(er) resistive short-circuit failure mode.

In contrast to the cell module by-pass of the document mentioned in the background section, WO 2010/102666, wherein the capacitor(s) of the cell module is used for energizing the gate units, the present invention discharges the capacitor(s) of the failed cell module. The inventive by-pass mode concept thus requires that the gate units are energized from outside the own cell module, since the cell module voltage must be zero. For this energizing, an adjacent cell module may be used for feeding the gate units of the failed cell module. Other alternatives comprise using a battery or optical power supply to feed the failed cell module.

Above, the failure in the cell module 20 has been described as being a failure of the IGBT of one phase-leg. As mentioned earlier, in such case it can be safely assumed that the device (IGBT) will be in short circuit failure mode for a certain time. Thereby the capacitor cell 29 can be discharged while keeping the other position in the failed phase-leg constantly OFF during the discharge phase.

However, the invention also encompasses the situation when the IGBT can be treated as being in an open circuit failure mode. For example, if the position failure is in fact caused by a gate unit failure, this may result in the failed position going OFF, which is equivalent to the IGBT being in an open circuit failure mode. In this case, the IGBT still has intact voltage withstand capability (since the gate unit is actually the failing device, not the IGBT). Therefore the healthy position (POS1) in the failed phase-leg can be switched ON during the discharge mode without risk for a short circuit in the failed phase-leg.

Figure 7A:
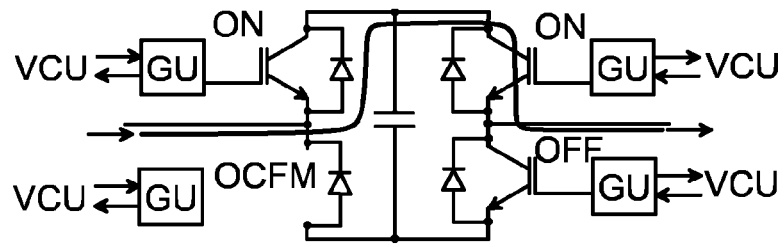
FIGS. 7a and 7b illustrate current paths during a discharge mode with failed device in open circuit failure mode.
Figure 7B:
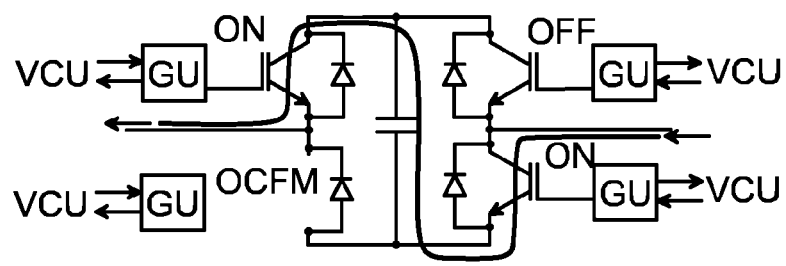

FIGS. 7a and 7b illustrate the current paths for the above situation when discharging the cell capacitor with the failed device being the gate unit, resulting in an open circuit condition for the failed position.

FIG. 7a illustrates a first half switching cycle, during which the capacitor cell 29 is not discharged. The current then flows through the IGBT 22 of POS2 and the diode 25 of POS1.

FIG. 7b illustrates the second half switching cycle, during which the capacitor cell 29 is discharged. The current then flows through the IGBT 23 of POS3, the cell capacitor 29 and the IGBT 21 of POS1.

Figure 8:
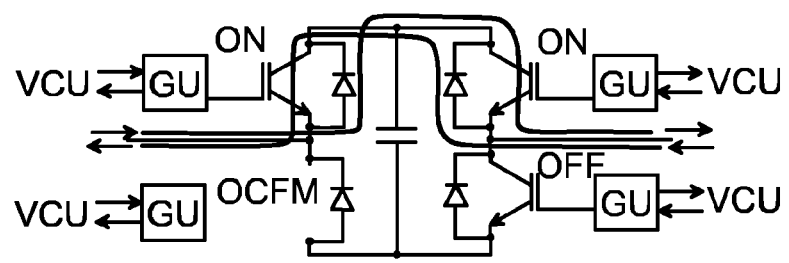
FIG. 8 illustrates current paths in the cell module in a bypass mode with failed device in open circuit failure mode.

FIG. 8 illustrates current paths of the cell module 20 in the by-pass mode thereof, and in particular when the failed device is the gate unit. In this case, as the POS4 is open circuit, the current flows through POS1 and POS2 during both half switching cycles. In the first current direction (first half switching cycle) the current flows through the diode 25 of POS1 and the IGBT 22 of POS2. In the second current direction (second half switching cycle) the current flows through the diode 26 of POS2 and the IGBT 21 of POS1.

Irrespective of whether the fault is considered as a short circuit failure mode or as an open circuit failure mode, a current path is provided that comprises the branch opposite to the branch comprising the failed device (IGBT or GU).

Figure 9:
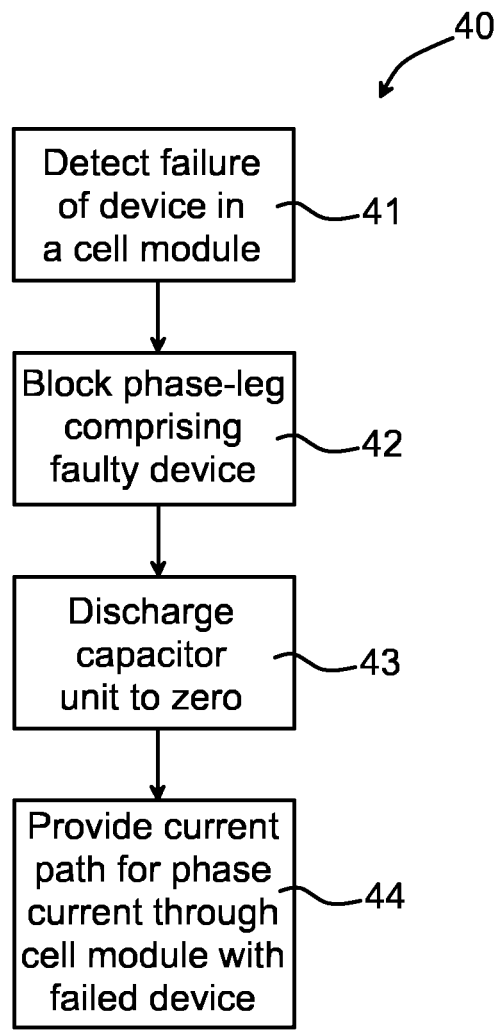
FIG. 9 illustrates a flow chart over steps of a method in accordance with an aspect of the invention.

FIG. 9 illustrates a flow chart over steps of a method in accordance with an aspect of the invention.

The method 40 is performed in a voltage source chain-link converter 1, as described earlier, for example performed by a control device 2 that controls the voltage source chain-link converter 1. The method 40 comprises a first step of detecting 41 a failure of a position (POS4) of one of the cell modules 10, 20, . . . , n. The failed position (POS4) may be composed of a failed semi-conductor switch 24, a failed free-wheeling diode 28 or a failed gate unit GU4.

This detection of a failure may for example comprise receiving information from sensors (not illustrated) of gate units GU1, GU2, GU3, GU4 of each semi-conductor switch position (POS1, POS2, POS3, POS4) and analyzing the information in order to detect fault conditions.

The method 40 comprises a second step of blocking 42 the phase-leg A that comprises the failed position, e.g. being a failed IGBT 24. This step of blocking comprises turning OFF the semi-conductor switch 21 of the other position (POS1) of the phase-leg A that comprises the failed position (e.g. IGBT 24).

The method 40 comprises a third step of discharging 43 to zero the capacitor unit 29 of the cell module 20 that comprises the failed position (e.g. IGBT 24). The step of discharging 44 has been thoroughly described earlier, e.g. with reference to FIGS. 4a, 4b, 5, 7a, 7b and comprises in essence switching the functioning second phase-leg B at zero current crossings.

The method 40 comprises the fourth step of providing 44 a current path 30 for the phase current through the cell module 20 with the failed position (e.g. IGBT 24). The current path 30 comprises the first branch 30, described earlier. The first branch 30 comprises corresponding positions of the first phase-leg A and the second phase-leg B in the full H-bridge arrangement. That is, the first branch comprises the upper positions or the lower positions of the phase-legs, depending on which device has failed. The first branch 30 is connected in parallel to the second branch 31, which comprises the failed position (e.g. IGBT 24). The second branch 31 comprises the remaining two positions of the full H-bridge arrangement, i.e. again upper or lower positions depending on which device has failed.

The invention also encompasses a computer program 4 (reference is made to FIG. 1) for controlling the voltage source chain-link converter as described. The computer program 4 comprises computer program code which when run on a processor 3 causes the control device 2, that is arranged to control the voltage source chain-link converter 1, to: detect a failure of a device 24 of one of the converter cell modules 10, 20, . . . , n; block the phase-leg A comprising the failed position 24; discharging to zero the capacitor unit 29 of the converter cell module 20 comprising the failed position 24, and provide a current path 30 for the phase current through the converter cell module 20 with the failed position 24, the current path 30 comprising a first branch 30, in turn comprising corresponding positions (POS1, POS2) of the first phase-leg A and the second phase-leg B in the full H-bridge arrangement, the first branch 30 being connected in parallel to a second branch 31 comprising the failed position 24, the second branch 31 comprising the remaining two positions (POS3, POS4) of the full H-bridge arrangement.

The invention further encompasses a computer program product 5 comprising the above computer program 4 and computer readable means on which the computer program 4 is stored. The control device 2 comprises any suitable central processing unit (CPU), microcontroller, digital signal processor (DSP), etc., capable of executing software instructions stored in the computer program product 5 e.g. in the form of a memory. The computer program product 5 can be a memory, such as any single one or combination of magnetic memory, optical memory, or solid state memory or even remotely mounted memory, or any combination of read and write memory (RAM) and read only memory (ROM). The computer program product 5 may be an optical disc, such as a CD (compact disc) or a DVD (digital versatile disc) or a Blu-Ray disc.

On the computer readable means the computer program 4 can be stored, which computer program can cause the control device 2 to execute a method according to embodiments described herein.

What is claimed is:

1. A method in a voltage source chain-link converter comprising one or more phases, each phase comprising a number of series-connected full bridge converter cell modules comprising four valves, each valve comprising a semi-conductor switch, the four valves being connected in a full H-bridge arrangement with a capacitor unit, each semi-conductor switch having a respective free-wheeling diode connected in parallel thereto, each full H-bridge arrangement comprising a first phase-leg and a second phase-leg, the method comprising the steps of:

detecting a failure of a position of one of the converter cell modules, the failed position comprising a failed semi-conductor switch, failed free-wheeling diode or failed gate unit;

blocking the first phase-leg comprising the failed position;

discharging to zero the capacitor unit of the converter cell module comprising the failed position; and providing a current path for a phase current through the converter cell module with the failed position, the current path comprising a first branch, in turn comprising corresponding positions of the first phase-leg and the second phase-leg in the full H-bridge arrangement, the first branch being connected in parallel to a second branch comprising the failed position, the second branch comprising two remaining positions of the full H-bridge arrangement, wherein the phase current is shared between the first branch and the second branch.

2. The method as claimed in claim 1, wherein the step of detecting the failure comprises receiving information from sensors of gate units of each semi-conductor switch position and analyzing the information in order to detect fault conditions.

3. The method as claimed in claim 1, wherein the step of blocking comprises turning OFF the semi-conductor switch of the other position of the first phase-leg comprising the failed position.

4. The method as claimed in claim 1, wherein the step of discharging comprises switching the second phase-leg at zero current crossings, while keeping a non-faulty semi-conductor switch of the first phase leg in ON or OFF state depending on fault conditions of the failed position.

5. A computer program embodied on a non-transitory computer readable medium, for controlling a voltage source chain-link converter comprising one or more phases, each phase comprising a number of series-connected full bridge converter cell modules comprising four valves, each valve comprising semi-conductor switches, the four valves being connected in a full H-bridge arrangement with a capacitor unit, each semi-conductor switch having a respective free-wheeling diode connected in parallel thereto, each full H-bridge arrangement comprising a first phase-leg and a second phase-leg, the computer program comprising computer program code which when run on a processor causes a control device controlling the voltage source chain-link converter to:

detect a failure of a position of one of the converter cell modules, the failed position comprising a failed semi-conductor switch, failed free-wheeling diode or failed gate unit;

block the first phase-leg comprising the failed position;

discharge to zero the capacitor unit of the converter cell module comprising the failed position; and provide a current path for a phase current through the converter cell module with the failed position, the current path comprising a first branch, in turn comprising corresponding positions of the first phase-leg and the second phase-leg in the full H-bridge arrangement, the first branch being connected in parallel to a second branch comprising the failed position, the second branch comprising two remaining positions of the full H-bridge arrangement, wherein the phase current is shared between the first branch and the second branch.

* * * * *